United States Patent
Miller et al.

[11] Patent Number: 5,855,642
[45] Date of Patent: Jan. 5, 1999

[54] SYSTEM AND METHOD FOR PRODUCING FINE METALLIC AND CERAMIC POWDERS

[75] Inventors: Steven A. Miller, Canton; Henry J. DeMita, Chelmsford, both of Mass.

[73] Assignee: Starmet Corporation, Concord, Mass.

[21] Appl. No.: 664,470

[22] Filed: Jun. 17, 1996

[51] Int. Cl.[6] ...................................................... B22F 9/00
[52] U.S. Cl. ............................... 75/338; 75/331; 75/330; 75/334; 75/336; 75/346; 260/200; 260/202; 264/8; 264/12
[58] Field of Search ............................ 75/338, 331, 330, 75/334, 336, 346; 266/200, 202; 264/8, 12

[56] References Cited

U.S. PATENT DOCUMENTS

| | | | |
|---|---|---|---|
| 3,099,041 | 7/1963 | Kaufmann | 18/2.6 |
| 3,765,866 | 10/1973 | Nayar | 75/0.5 |
| 3,784,656 | 1/1974 | Kaufmann | 264/8 |
| 3,802,816 | 4/1974 | Kaufmann | 425/8 |
| 4,207,040 | 6/1980 | Meltcalfe et al. | 425/8 |
| 4,284,394 | 8/1981 | Thompson | 425/8 |
| 4,310,292 | 1/1982 | Carlson et al. | 425/8 |
| 4,343,750 | 8/1982 | Holiday et al. | 264/8 |
| 4,355,057 | 10/1982 | Slaughter | 427/216 |
| 4,675,140 | 6/1987 | Sparks et al. | 264/4.3 |
| 4,793,853 | 12/1988 | Kale | 75/0.5 |
| 5,340,377 | 8/1994 | Accary et al. | 75/334 |

*Primary Examiner*—Patrick Ryan
*Assistant Examiner*—M. Alexandra Elve
*Attorney, Agent, or Firm*—Iandiorio & Teska

[57] ABSTRACT

A system and method for producing fine powders. The system includes a rotary atomization device for forming a moving flow of a molten source material; a source of atomizing material; a nozzle for directing a jet of the atomizing material at the moving flow of molten source material for atomizing and for producing fine droplets of the source material; and a chamber for collecting the fine droplets.

68 Claims, 4 Drawing Sheets

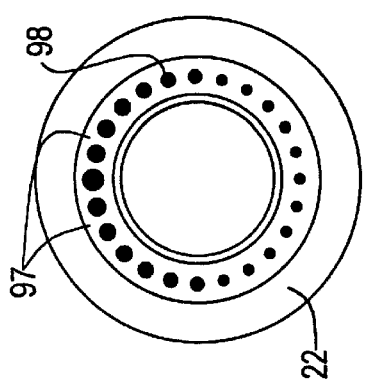
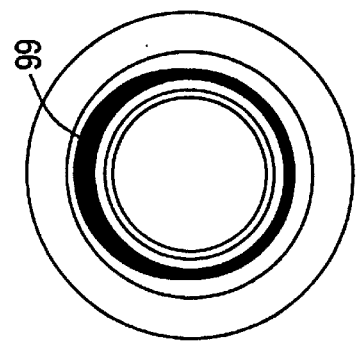
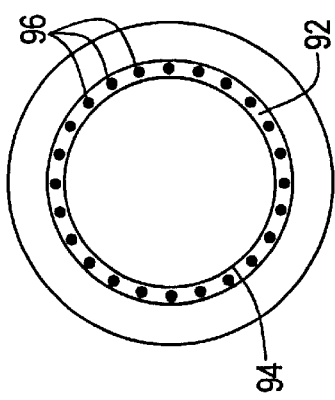
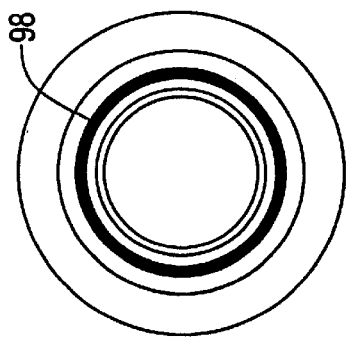
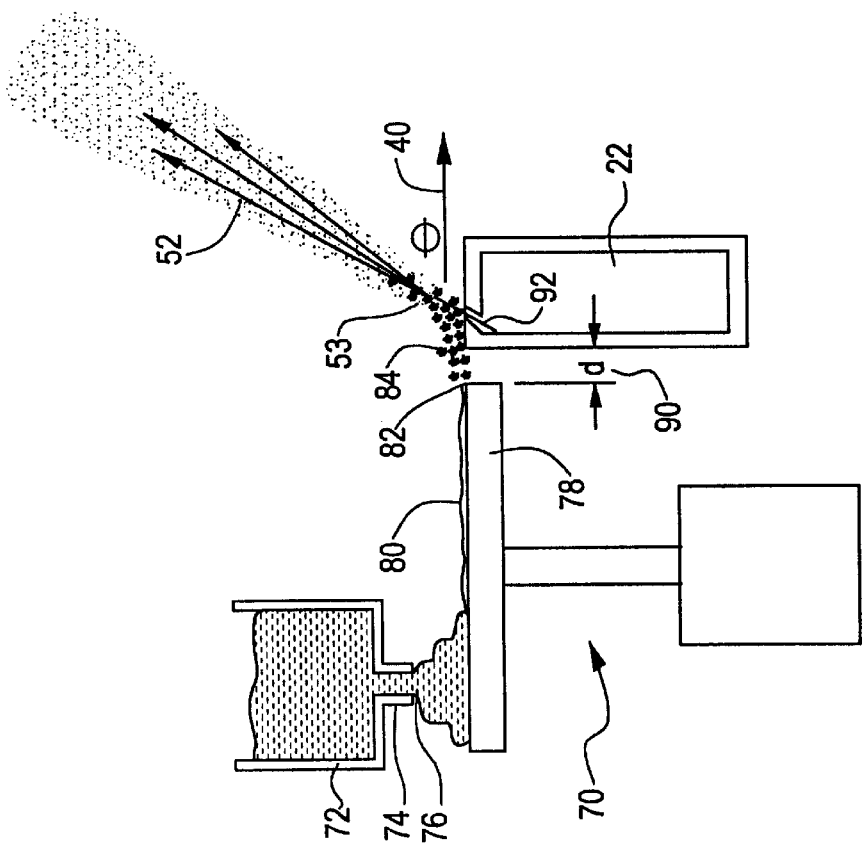

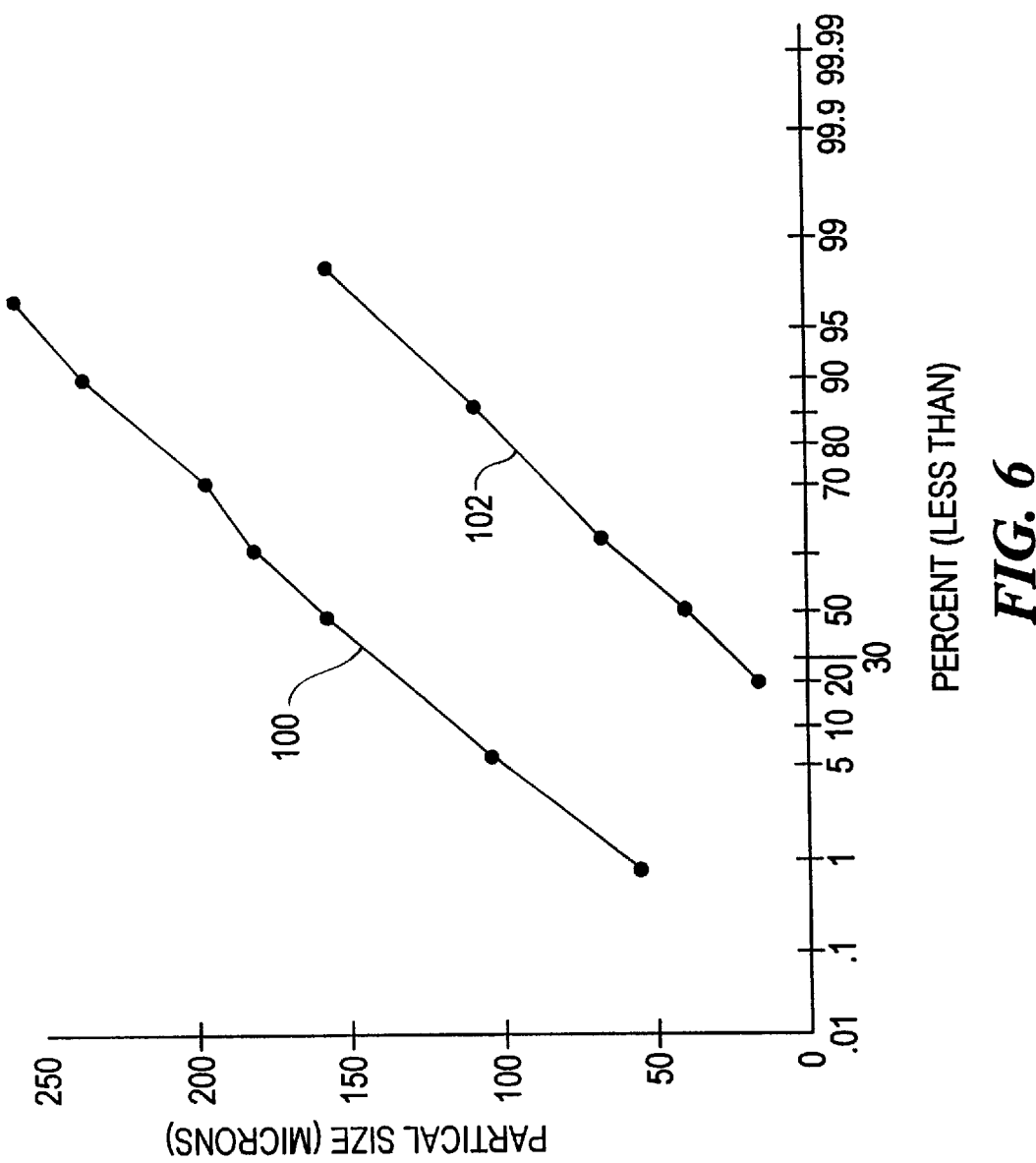

SYSTEM AND METHOD FOR PRODUCING FINE METALLIC AND CERAMIC POWDERS

FIELD OF INVENTION

A system and method for producing fine metallic and ceramic powders such as titanium, niobium, nickel, and alumina and zirconia powders formed by directing a high velocity jet of gas or liquid at the molten metallic and ceramic material as it flows off the rotating surface of a rotary atomization device.

BACKGROUND OF INVENTION

Fine metallic and ceramic powders (e.g. less than 40 microns in diameter) are in demand for injection molding processes: larger size powders cannot be efficiently used to fabricate parts and components using this manufacturing process. Titanium is one such metallic material that is lately in demand. Examples of ceramic materials includes alumina and zirconia.

The assignee of the instant application owns U.S. Pat. Nos. 3,099,041 and 3,802,816 directed to production of spherical metallic powders using a rotating electrode process. In this "rotary atomization" process, a consumable cylindrical metallic electrode is rotated within a chamber. A non-consumable electrode is spaced from the consumable rotating electrode and an electric arc between the two electrodes melts the end surface of the consumable electrode forming a film which is cast off by centrifugal force forming droplets which cool to form powders that are collected within the chamber. The mean size of Ti-6-4 powder formed by this process, however, is too large for many industrial applications. As a result, the cost of such metallic powders is high due to the need to screen off the larger size powders from the usable powders.

Previous attempts to reduce the size of the powder has focused on increasing the rotational speed of the rotating consumable electrode. A rotational speed limit of between 15,000–18,000 rpm, however, has been reached due to the linear speed limitations of mechanical bearings of such devices and the damage that occurs in the rotary systems due to imbalances of the system during atomization. There has been some attempt to use vaned rotating disks and cryogenic fluids to improve powder yields. See U.S. Pat. Nos. 4,347,199 and 4,419,060. These attempts, however, have not been successfully developed since the disks are often destroyed during the process ruining the atomization equipment and contaminating the powders.

Another method of forming metallic powders is the gas atomization process. Gas atomization is proven capable of producing powders from non-reactive melts such as iron and aluminum with median sizes down to 40 microns or less. Gas atomization, however, has not been successfully applied to producing large quantities of reactive alloys such as titanium because there is no way of containing and delivering the reactive molten metal in a controlled and continuous manner to the gas nozzle. Batch processing using induction melting in a cooled copper hearth, as shown in U.S. Pat. Nos. 5,084,091 and 5,213,610 have been developed for gas atomizing reactive metals, but the resultant powder is expensive due to the small batch sizes of 25 to 50 Kg. Furthermore, the powder sizes are often too large and require extensive screening due to difficulty of controlling the melt delivery to the atomization region.

SUMMARY OF INVENTION I

It is therefore an object of this invention to provide an improved system and method for producing fine metallic and ceramic powders.

It is a further object of this invention to provide such a system and method which produces fine and metallic and ceramic powders without the need to increase the rotational speed of the rotary atomization device.

It is a further object of this invention to provide such a system and method which is capable of making large quantities of fine powder from reactive alloys such as titanium in a cost efficient manner.

This invention results from the realization that fine metallic and ceramic powders can be efficiently mass produced by using a rotary atomization device to form large molten droplets and then subdividing these large droplets into finer droplets before they solidify by using a high velocity jet of gas or liquid directed at the large droplets to overcome the surface tension which makes the large droplets cohesive.

This invention features a system for producing fine powders. The system comprises: means for forming a moving flow of a molten source material; a source of atomizing material; means for directing a jet of the atomizing material at the moving flow of molten source material for atomizing and for producing fine droplets of the source material; and means for collecting the fine droplets. The jet of atomizing material is preferably directed at an angle of between 75° and 120° with respect to the direction of the flow of the molten source material. The means for directing should be located within 75 mm of the means for forming. The means for directing may include opposing jets of the atomizing material forming a converging jet spray. The means for directing may include a plurality of nozzle orifices spaced about the means for forming. The orifices may have different diameters. Alternatively, the means for directing includes a nozzle with an annular orifice which may have variable width.

In one embodiment, the means for forming includes a rotating consumable bar of the source material and some means for melting an end surface of the bar. The rotating consumable bar is preferably a first electrode and the means for melting includes a second electrode aimed at the surface and means for striking an electrical arc between the two electrodes. The second electrode is preferably aimed off the center of the surface of the first electrode. The means for directing includes a nozzle with at least one orifice located within 75 mm of the rotating consumable bar and within 75 mm of an edge of the end surface. Also, the orifice is aimed at the rotating consumable bar to constrain the jet spray by the bar.

In another embodiment, the means for forming includes a molten supply of the source material, a rotating disk, and means for transferring a stream of the molten source material to the rotating disk. The means for transferring includes a supply outlet positioned off the center of the rotating disk. The means for directing includes a nozzle with at least one orifice located within 75 mm of an edge of the rotating disk.

In either embodiment, the nozzle is directed at coarse particles of the moving flow of molten source material, or alternately, directed at ligaments of the moving flow of molten source material.

The source material is typically selected from the group consisting of steel, zirconia, molebdumum, nickel, cobalt, copper, tantalum, columbian, beryllium, titanium, niobium, and nickel based super alloys but is preferably titanium or a mixture of alumina and zirconia.

The atomizing material is an inert gas such as argon or helium, or even a reactive gas mixture to form a surface coating on the fine droplets. The atomizing material may also be a liquid. The means for collecting includes a chamber enclosing the means for forming and the means for directing.

This invention also features a method for producing fine powders, the method comprising: forming a moving flow of a molten source material; directing a jet of atomizing material at the moving flow of molten source material for atomizing and for producing fine droplets of the source material; and collecting the fine droplets. The jet of atomizing material is directed at an angle between 75° and 120° with respect to the direction of the flow of the molten source material.

Directing may include establishing opposing jets of the atomizing material forming a converging jet spray or incorporating a plurality of nozzle orifices spaced about the means for forming. The orifices may have different diameters. Also used is a nozzle with an annular orifice with a variable width. The jet of atomizing material has a velocity which is at least three times the velocity of the moving flow of molten source material.

In one embodiment, forming includes using a rotating consumable bar of the source material and melting an end surface of the bar. The rotating consumable bar is a first electrode and melting includes aiming a second electrode at the surface and striking an electrical arc between the two electrodes. The second electrode is aimed off the center of the surface of the first electrode. Directing includes locating a nozzle with at least one orifice within 75 mm of the rotating consumable bar and within 75 mm of an edge of the end surface. Directing also may include locating a nozzle with at least one orifice aimed directly at the rotating consumable bar to constrain the jet spray by the bar.

In another embodiment, forming includes using a molten supply of the source material, and a rotating disk, and transferring a stream of the molten source material to the rotating disk. Transferring includes positioning a supply outlet off the center of the rotating disk. Directing includes locating a nozzle with at least one orifice within 75 mm of an edge of the rotating disk.

In either embodiment, the source material is selected from the group consisting of steel, zirconia, molebdumum, nickel, cobalt, copper, tantalum, columbian, beryllium, titanium, niobium, and nickel based super alloys but is preferably titanium or a mixture of alumina and zirconia.

The source of atomizing material is an inert gas such as argon or helium. The atomizing material may include a reactive gas mixture to form a surface coating on the fine droplets such as oxygen to form an oxide coating on the fine droplets.

BRIEF DESCRIPTION OF THE DRAWINGS

Other objects, features and advantages will occur to those skilled in the art from the following description of a preferred embodiment and the accompanying drawings, in which:

FIG. 4 is a side view of another embodiment of the subject invention which uses a rotating disk apparatus in conjunction with one or more gas jets in accordance with this invention;

FIGS. 5A–5D are is a schematic views of other nozzle configurations used in the subject invention; and FIG. 6 is a graph showing the powder sizes obtained in accordance with the subject invention as compared to the powder sizes obtained by rotary atomization processes.

DISCLOSURE OF PREFERRED EMBODIMENT

Figure 1:
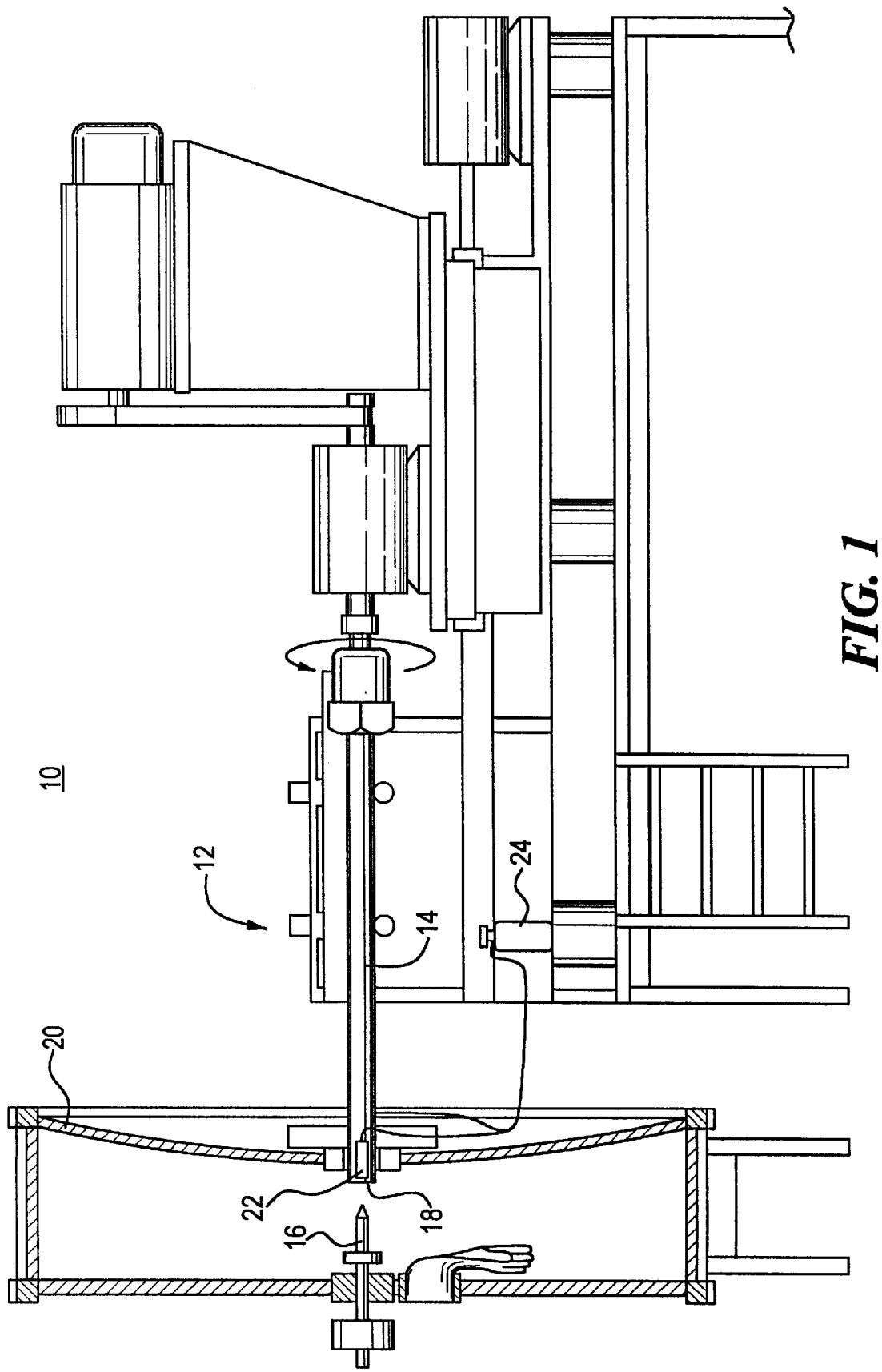
FIG. 1 is a schematic view of the preferred embodiment of the system for producing fine metallic and ceramic powders in accordance with this invention.

System 10, FIG. 1 of this invention for producing fine metallic and ceramic powders includes means for forming a molten film of either a metallic or a ceramic material and for urging the film in a first direction. In a preferred embodiment, such means include rotary atomization apparatus 12 which includes rotating consumable bar electrode 14 and a second electrode 16 spaced from the surface 18 of rotating consumable electrode 14 as shown within chamber 20. An electrical arc is caused to occur between electrode 16 and rotating consumable electrode 14 thus melting surface 18 as described in U.S. Pat. Nos. 3,099,041 and No. 3,802,816 incorporated herein by this reference.

In the subject invention however, device 12 is modified to include one or more nozzles 22 for directing a jet of atomizing gas or liquid from pressurized source 24 at the film or ligaments of molten material formed on the end surface 18 of consumable rotating electrode 14 as the molten material is cast off end surface 18 due to the centrifugal force acting on the film of molten material.

Figure 2:
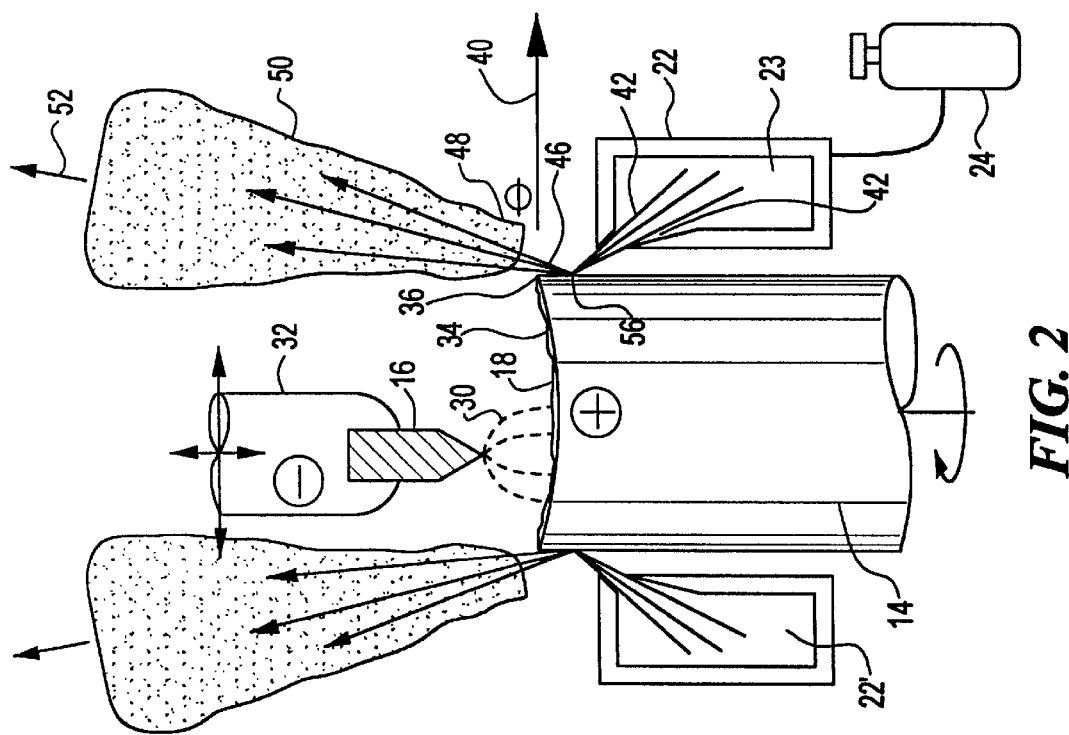
FIG. 2 is a schematic view showing a preferred orientation of the gas jet nozzle with respect to the rotating consumable electrode of the system shown in FIG. 1.

As shown in more detail in FIG. 2, cylindrical bar 14 is an electrode 14 rotated at between 10,000 15,000 rpm in the presence of electrode 16 and electrical arc 30 is transferred from electrode 16 to end surface 18 of electrode 14 forming a thin film 34 of molten material. Electrode 16 is housed in water cooled copper rod 32. Other techniques for heating end surface 18 of rotating consumable bar 14 include the use of plasma guns, flames, laser energy, and induction methodologies.

When end surface 18 of rotating consumable electrode 14 is thus heated, a pool of molten source material 34 forms on electrode surface 18. Under the effect of the centrifugal forces caused by the rotation of electrode 14, the pool of source material 34 thins out and flows towards the edge 36 of the electrode 14. At the edge of the electrode, the molten material forms ligaments and droplets that fly off into space in the direction shown by vector 40.

Nozzle 22 is located just beneath the plane formed by the molten droplets. Nozzle 22 includes plenum 23 and one or more orifices 42. Gas jet 46 exiting orifice 42 passes through the plane of a large droplets coming off the edge 36 of rotating electrode 14. When the high velocity gas jet 46 intersects the large droplets, it atomizes them into smaller droplets defining atomization zone 48.

The outer edge of zone 48 is preferably within 75 mm (preferably less than 25.4 mm) of the edge 36 of rotating electrode 14. Atomization occurs in this zone because the high velocity gas creates a large aerodynamic drag force on the large droplets overcoming the surface tension forces which tend to make the individual large droplets cohesive. The fine droplets thus formed in atomization zone 48 become entrained in the gas jet forming a spray 50 that has a direction as shown by vector 52 which is preferably transverse to the normal course of the large droplets as they exit the edge 36 of rotating electrode 14 (shown by vector 40). The angle formed between the plane of the large droplets and the gas jet, shown as angle θ, is preferably between 75° and 120°. The optimal angle would be 180° but the rotary atomization equipment prevents this optimal angle from being attained. A 0° angle or any angle less than 75° would work but may provide a lower yield of fine powders. The fine droplets in spray 50 solidify into a powder which can be collected as described in U.S. Pat. Nos. 3,099,041 and 3,802,816 within chamber 20, FIG. 1.

Consumable electrode 14 may be formed of steel, molybdenum, nickel, cobalt, copper, tantalum, columbium, beryllium, titanium, niobium, and nickel based super alloys. If plasma or laser heating methods are used, non-conductive materials such as alumina and zirconia may be made into fine powders in accordance with this invention.

Figure 3:
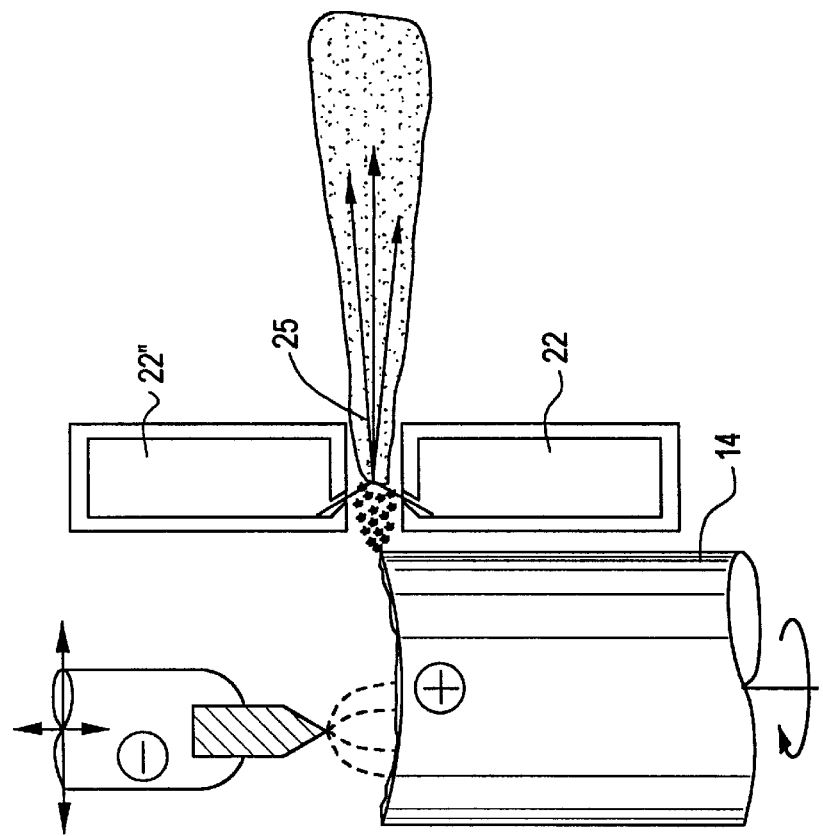
FIG. 3 is a schematic view of two opposing nozzles used to form a converging jet spray of the atomizing material in accordance with this invention.

In the preferred embodiment, nozzle 22 is aimed at the side wall 56 of rotating electrode 14 to partially constrain gas jet 46 by electrode 14. Once gas jet 46 contacts bar surface 56, it remains attached thereto and focuses its energy right at the point where film 34 of molten material is thrown off the electrode surface. The thin molten film is thus atomized directly into fine droplets and the atomization zone 48 is substantially in contact with edge 36 of rotating consumable electrode 14. The other advantage of this approach is that nozzle 22 is protected from the hot liquid droplets by gas jet 46. Experiments were conducted with a planar design nozzle 22 resulting in a flat, fan shaped gas jet 46. Such a nozzle is commercially available as a model 727 "Windjet" from the Spraying Systems Company and two or three such nozzles 22 and 22' may be spaced around rotating consumable electrode 14 as shown in FIG. 2. Also, nozzle 22", FIG. 3 may be placed above the plane of the droplets and/or opposing nozzle 22 to produce converging gas flow region 25 to constrain the molten droplets or ligaments. Nozzle 22 has 16 orifices approximately 0.88 mm in diameter with a spacing of approximately 2.54 mm.

In laboratory experiments, an argon gas source 24 at a pressure of 1.7 MPa was delivered to nozzle 22 and a 1018 steel electrode 14 was spun at 10,000 rpm. Angle θ was varied from 90° to 120°.

In another embodiment, nozzle 22 is aimed directly at the area in space adjacent to edge 36 where the molten metal forms ligaments and larger droplets instead of at the side wall 56 of rotating consumable electrode 14. In this embodiment, the near side of atomization zone 48 is within 25.4 mm of edge 36 of rotating consumable electrode 14 in contrast to the far side of atomization zone 48 being within 25.4 mm of edge 36 as shown in FIG. 2.

The importance of the location and intensity of the atomization zone is best understood by the reference to the equation:

$$We = D\rho \frac{V^2}{\sigma} \quad (1)$$

where D is the diameter of the droplets or ligaments that will be unstable and undergo further atomization in the atomization zone, V is the velocity difference between the gas jet and the droplets, p is the gas density, and σ is the surface tension of the alloy. The numerator of equation (1) is the drag force created on the droplets and acts to disrupt the droplets. The denominator of equation (1) is surface tension of the droplets and acts to keep the droplets cohesive. When the ratio of the numerator and the denominator exceeds a critical value, the droplets become unstable and subdivide or atomize into smaller, finer droplets. Thus, this "Weber" (We) number indicates that velocity is the dominant term and that it is important to maximize the velocity difference between the gas and the molten metal in order to reatomize the larger droplets or ligaments. This is accomplished by using plenum pressures and expansion ratios that create a supersonic flow of the gas emanating from gas nozzle 22; causing the gas flow to be as anti-parallel to the original droplet velocity as possible; and by locating nozzle 22 as close as possible to the edge 36 of rotating consumable electrode 14 and the plane of the metal spray as shown by vector 40. Close proximity of the gas orifice to the rotating consumable electrode and the atomization zone provides a well defined and intense gas jet in the atomization zone in order to maximize the atomization efficiency of the jet.

The gas used may be an inert gas such argon or helium. Reactive gas mixtures may also be used, however, such as an argon/oxygen mixture to produce an oxide coating on the surface of the metal powders. Also, the gas may be replaced by a liquid such as a cryogenic argon or even water. If liquid is used, it is beneficial to contain the liquid within a spinning drum so that the plane of the large ligaments and droplets is perpendicular to the axis of the drum.

Chamber 20, FIG. 1, is a vacuum/pressure vessel which allows the molten metal to be protected in an inert atmosphere such as argon or helium or purposely reacted in a controlled manner by using a dilute oxygen atmosphere.

As an example, if the gas plenum 23, is pressurized with argon to a pressure of 2.8 mPa, it can be shown that under isentropic conditions the gas jet will have a velocity of approximately 440 m/s. This velocity is almost nine times greater than the velocity of approximately 50 m/s for droplets coming off a spinning consumable electrode if the electrode is 75 mm in diameter and rotating at 15,000 rpm. Thus, by the We number analysis, the large droplets and ligaments formed by the spinning electrode will be reatomized by the gas jet.

In an another embodiment, the means for forming includes rotating disk atomization device 70, FIG. 4, also shown in U.S. Pat. No. 4,343,750 incorporated herein by this reference. A source 72 of molten material is presented to nozzle 74 which collimates the molten material into stream 76. As the stream of metal contacts spinning disk 78, it spreads out to form a thin film 80. The gravitational and centrifugal forces cause film 80 to thin out and move to the edge 82 of rotating disk 78 where it is thrown off as large liquid droplets and ligaments 84. Nozzle 22 directs a jet of atomizing material such as a gas or liquid at large liquid droplets and ligaments 84 producing finer droplets as described above. Again, distance (d) as shown at 90 between atomization zone 53 and edge 82 of disk 78 is a maximum of 75 mm (preferably less than 25 mm) and the distance between the orifices 92 of nozzle 22 and the plane defined by the course of travel of the droplets and ligaments 84 is a maximum of 75 mm. (preferably less than 25 mm). Also, θ the angle between plane formed by the large droplets and ligaments 84 as they are cast off disk 78 and the direction of the gas spray (shown by vector 52) is between substantially 0° and 125°, but preferably about 90°.

One advantage of utilizing a rotating disk atomization apparatus is that the task of melting the source material is accomplished separately from atomization allowing the use of a higher melt temperatures. For highly reactive materials, the melting operation can be accomplished in a cooled copper crucible. One disadvantage is that the melt tends to slip on rotating disk 78 and may not achieve as high an angular velocity as with the rotating consumable electrode device shown in FIG. 1.

In conventional rotating disk atomization devices, the melt is delivered to the center of rotating disk 78 instead of off center as shown in FIG. 4. For effective atomization, however, the center stream approach would require a gas nozzle subsystem which completely surrounds the entire circumference of disk 78 resulting in excess gas usage. In the subject invention, the melt is delivered off the center of the rotating disk 78 as shown in FIG. 4 to cause the molten metal to be cast off from only a small segment of disk 78 instead of the entire periphery of the disk. By concentrating the molten metal spray 76, it is possible to use the atomization gas more efficiently.

The same approach is accomplished with the rotating consumable bar electrode device by orienting the non-consumable electrode off the center of the rotating consumable electrode as shown in FIGS. 1 and 2.

Further improvements in the nozzle design are shown in FIGS. 5A–5D. In FIG. 5A, nozzle 92 is circular in design about the surface of the rotating disk or consumable electrode 94. Nozzle 92 includes multiple gas orifices 96. The gas orifices may form a complete circle around the perimeter of the consumable bar or electrode, or just a partial circle depending on where the liquid droplets are cast off the bar surface. Additionally, the individual gas orifices may be sized proportionately to the local mass flux of the metal leaving the bar. Thus, the gas orifices are larger in region 97, FIG. 5B (approximately 0.050") where larger amounts of metal are leaving the bar, and smaller (approximately 0.030") in regions where lesser amounts of metal are leaving the bar. Such an approach results in a more efficient use of the atomizing gas. FIG. 4C shows a circular gas annulus nozzle 98 where the gas orifice is a circular slit. Where warranted, the slit may form a compete circular annulus and also have varying cross sections as shown at 99 in FIG. 5D to adjust the local gas flow to the source material mass flux. Finally, a De Laval nozzle, or concerning diverging nozzle could be used to enhance the persistence of the supersonic flow of the gas jet.

As shown in FIG. 6, the use of rotary atomization techniques produce particle sizes in the range shown by line 100 whereas the particle sizes formed in accordance with the subject invention using the rotary atomization device in conjunction with gas atomization results in much smaller particle sizes as shown by line 102. Experiments thus far included the use of a single and "windjet" nozzle but it is expected that further improvements using the nozzle configurations and designs shown in FIGS. 3 and 5A–5D will even further increase the yield of fine particles.

The subject invention combines the technology of rotary atomization and gas atomization. The gas jet nozzle should be placed sufficiently close to the rotary atomization device and in a preferred embodiment the nozzle is aimed at the rotating consumable electrode to constrain the atomization zone. Also, the nozzle should be located just under or over the plane defined by the flow of molton droplets or ligaments. The angle between the direction of the gas jet and the direction of the molten material cast off the electrode is between 75° and 120°. The velocity of the gas jet is at least three times the velocity of the molten source material as it is cast off the rotating electrode thereby creating a sufficient drag force on the larger droplets formed by rotary atomization to atomize them into smaller, finer droplets. The gas jet may contact the molten material at the point where it is cast off the rotating electrode or at a point in space after the large droplets are formed.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A system for producing fine powders, the system comprising:

means for forming a radially moving flow of molten source material;

a source of atomizing material;

means, located within 75 mm of said means for forming, for directing a jet of the atomizing material at the moving flow of molten source material for atomizing and for producing fine droplets of the source material, the jet of atomizing material having a velocity at least three times the velocity of the moving flow of molten source material; and means for collecting said fine droplets.

2. The system of claim 1 in which the jet of atomizing material is directed at an angle with respect to the direction of the flow of the molten source material.

3. The system of claim 2 in which said angle is between 75° and 120°.

4. The system of claim 1 in which said means for directing includes opposing jets of the atomizing material forming a converging jet spray.

5. The system of claim 1 in which the means for directing includes a plurality of nozzle orifices spaced about said means for forming.

6. The system of claim 5 in which said orifices have different diameters.

7. The system of claim 1 in which said means for directing includes a nozzle with an annular orifice.

8. The system of claim 7 in which said annular orifice has a variable width.

9. The system of claim 1 in which the means for forming includes a rotating consumable bar of said source material and means for melting an end surface of said bar.

10. The system of claim 9 in which the rotating consumable bar is a first electrode and said means for melting includes: a second electrode aimed at said surface, and means for striking an electrical arc between the two electrodes.

11. The system of claim 10 in which said second electrode is aimed off the center of said surface of said first electrode.

12. The system of claim 9 in which said means for directing includes a nozzle with at least one orifice located within 75 mm of said rotating consumable bar.

13. The system of claim 9 in which said means for directing includes a nozzle with at least one orifice located within 75 mm of an edge of said end surface.

14. The system of claim 9 in which said means for directing includes a nozzle with at least one orifice aimed at said rotating consumable bar to constrain said jet by said bar.

15. The system of claim 1 in which said means for forming includes a molten supply of said source material, a rotating disk, and means for transferring a stream of said molten source material to said rotating disk.

16. The system of claim 15 in which said means for transferring includes a supply outlet positioned off the center of said rotating disk.

17. The system of claim 15 in which said means for directing includes a nozzle with at least one orifice located within 75 mm of an edge of said rotating disk.

18. The system of claim 1 in which said means for directing includes a nozzle with at least one orifice directed at coarse particles of the moving flow of molten source material.

19. The system of claim 1 in which means for directing includes a nozzle with at least one orifice directed at ligaments of the moving flow of molten source material.

20. The system of claim 1 in which said source material is selected from the group consisting of steel, zirconia, molybdenum, nickel, cobalt, copper, tantalum, beryllium, titanium, niobium, and nickel based super alloys.

21. The system of claim 1 in which said source material is titanium.

22. The system of claim 1 in which said source material is a mixture of alumina and zirconia.

23. The system of claim 1 in which said source of atomizing material is an inert gas.

24. The system of claim 23 in which said inert gas is argon.

25. The system of claim 23 in which said inert gas is helium.

26. The system of claim 1 in which said source of atomizing material includes a reactive gas mixture to form a surface coating on said fine droplets.

27. The system of claim 26 in which said reactive gas mixture includes oxygen to form an oxide coating on said fine droplets.

28. The system of claim 1 in which said atomizing material is a liquid.

29. The system of claim 1 in which said means for collecting includes a chamber enclosing said means for forming and said means for directing.

30. A system for producing fine powders, the system comprising:

a consumable bar of a source material;

means for melting a surface of said bar;

means for rotating said bar to cast molten source material off said surface; and means, located within 75 mm of said rotating bar, for directing a jet of atomizing material at the molten source material for atomizing and producing fine droplets of said source material, the jet of atomizing material having a velocity which is at least three times the velocity of the molten source material.

31. The system of claim 30 in which the jet is directed at an angle with respect to the direction of travel of the source material.

32. The system of claim 31 in which said angle is between 75° and 120°.

33. The system of claim 30 in which said means for directing is located within 75 mm of an edge of said melted surface.

34. The system of claim 30 in which said means for directing includes opposing jets of the atomizing material forming a converging jet spray.

35. The system of claim 30 in which the means for directing includes a plurality of nozzle orifices spaced about said consumable bar.

36. The system of claim 35 in which said orifices have different diameters.

37. The system of claim 35 in which said means for directing includes a nozzle with an annular orifice about said consumable bar.

38. The system of claim 32 in which said annular orifice has a variable width.

39. The system of claim 30 in which the rotating consumable bar is a first electrode and said means for melting includes: a second electrode aimed at said surface, and means for striking an electrical arc between the two electrodes.

40. The system of claim 39 in which said second electrode is aimed off the center of said surface of said first electrode.

41. The system of claim 30 in which said means for directing includes a nozzle with at least one orifice aimed at said rotating consumable bar to constrain said jet by said bar.

42. The system of claim 30 in which said consumable bar is made from a material is selected from the group consisting of steel, zirconia, molybdenum, nickel, cobalt, copper, tantalum, beryllium, titanium, niobium, and nickel based super alloys.

43. The system of claim 30 in which said consumable bar is titanium.

44. The system of claim 30 in which said consumable bar is a mixture of alumina and zirconia.

45. The system of claim 30 in which said atomizing material is an inert gas.

46. The system of claim 45 in which said inert gas is argon.

47. The system of claim 45 in which said inert gas is helium.

48. The system of claim 30 in which said atomizing material includes a reactive gas mixture to form a surface coating on said fine droplets.

49. The system of claim 48 in which said reactive gas mixture includes oxygen to form an oxide coating on said fine droplets.

50. The system of claim 30 in which said atomizing material is a liquid.

51. A system for producing fine powders, the system comprising:

a disk;

a molten supply of a source material;

means for transferring a stream of said molten source material to a surface of said disk;

means for rotating said disk to cast molten source material off said disk surface; and means, located within 75 mm of an edge of said disk surface, for directing a jet of atomizing material at the molten source material for atomizing and for producing fine droplets of the source material, the jet of atomizing material having a velocity which is at least three times the velocity of the cast off molten source material.

52. The system of claim 51 in which the jet of atomizing material is directed at an angle with respect to the direction of travel of the molten source material.

53. The system of claim 52 in which said angle is between 75° and 120°.

54. The system of claim 51 in which said means for directing includes opposing jets of the atomizing material forming a converging jet spray.

55. The system of claim 51 in which the means for directing includes a plurality of nozzle orifices spaced about said disk.

56. The system of claim 55 in which said orifices have different diameters.

57. The system of claim 51 in which said means for directing includes a nozzle with an annular orifice about said disk.

58. The system of claim 57 in which said annular orifice has a variable width.

59. The system of claim 51 in which said means for transferring includes a supply outlet positioned off the center of said rotating disk.

60. The system of claim 51 in which said source material is selected from the group consisting of steel, zirconia, molybdenum, nickel, cobalt, copper, tantalum, beryllium, titanium, niobium, and nickel based super alloys.

61. The system of claim 51 in which said source material is titanium.

62. The system of claim 51 in which said source material is a mixture of alumina and zirconia.

63. The system of claim 51 in which said atomizing material is an inert gas.

64. The system of claim 63 in which said inert gas is argon.

65. The system of claim 63 in which said inert gas is helium.

66. The system of claim 51 in which said atomizing material includes a reactive gas mixture to form a surface coating on said fine droplets.

67. The system of claim 66 in which said reactive gas mixture includes oxygen to form an oxide coating on said fine droplets.

68. The system of claim 51 in which said atomizing material is a liquid.

* * * * *